United States Patent
Reformato et al.

(10) Patent No.: US 6,233,315 B1
(45) Date of Patent: May 15, 2001

(54) METHODS AND APPARATUS FOR INCREASING THE UTILITY AND INTEROPERABILITY OF PERIPHERAL DEVICES IN COMMUNICATIONS SYSTEMS

(75) Inventors: John R. Reformato, East Meadow, NY (US); Joan Lawlor, Greenwich, CT (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/082,551

(22) Filed: May 21, 1998

(51) Int. Cl.$^7$ .............................. H04M 1/64; H04M 3/42; H04M 7/00; H04M 8/00
(52) U.S. Cl. .................................... 379/88.01; 379/88.04; 379/93.09; 379/201; 379/207; 379/309; 379/88.02
(58) Field of Search ................................. 379/67.1, 88.01, 379/88.03, 88.12, 88.15, 88.18, 88.22, 88.25, 201, 210, 372, 373, 229, 230, 88.17, 211, 207, 93.11, 93.12; 455/401, 403, 412, 461, 414; 370/352, 389, 401; 704/246, 270.1, 275

(56) References Cited

U.S. PATENT DOCUMENTS

| | | |
|---|---|---|
| 4,737,976 | 4/1988 | Borth et al. ............................. 379/58 |
| 4,747,124 | 5/1988 | Ladd ....................................... 379/67 |
| 4,757,525 | 7/1988 | Matthews et al. ...................... 379/89 |
| 4,763,350 | 8/1988 | Immendorfer et al. ................ 379/67 |
| 4,827,500 | 5/1989 | Binkerd et al. ........................ 379/88 |
| 4,853,953 | 8/1989 | Fujisaki .................................. 379/88 |
| 4,864,622 | 9/1989 | Iida et al. ............................... 381/41 |
| 4,878,240 | 10/1989 | Lin et al. ................................ 379/67 |
| 4,879,743 | 11/1989 | Burke et al. ........................... 379/142 |
| 4,908,864 | 3/1990 | Togawa et al. ........................ 381/43 |
| 4,914,690 | 4/1990 | Hagedorn .............................. 379/233 |
| 4,922,538 | 5/1990 | Tchorzweski .......................... 381/42 |
| 4,926,461 | 5/1990 | Kuok ...................................... 379/67 |
| 4,926,462 | 5/1990 | Ladd et al. ............................. 379/67 |
| 4,928,302 | 5/1990 | Kaneuchi et al. ..................... 379/88 |
| 4,932,042 | 6/1990 | Baral et al. ............................. 379/67 |
| 4,945,557 | 7/1990 | Kaneuchi et al. ..................... 379/67 |
| 4,961,212 | 10/1990 | Marui et al. ........................... 379/67 |

(List continued on next page.)

*Primary Examiner*—Allan Hoosain
(74) *Attorney, Agent, or Firm*—Straub & Pokotyloy; Michael P. Straub

(57) ABSTRACT

Methods and apparatus for increasing the utility and interoperability of peripheral devices such as, voice mail devices and voice dialing platforms, used in communications systems are described. Methods of efficiently providing speech recognition functionality to multiple subscribes through the use of centralized speech recognition circuits are also described. One feature of the invention is directed to dynamically enabling/disabling an automatic connection feature whereby a central office switch connects a subscriber to an intelligent peripheral device in response to an off-hook condition. In one embodiment the C.O. switch's automatic peripheral device connection feature is only enabled when a voice mail IP has a waiting message thereby reducing or eliminating unnecessary connections to the voice mail IP. In order to support automatic connection to multiple IPs in response to an off-hook condition, in one embodiment a caller is connected to a control IP in response to an off-hook condition. The control IP then automatically connects the caller to one or more IPs as appropriate. In this manner a subscriber can access, e.g., sequentially, multiple IPs without having to dial the IPs or take other steps to affirmatively connect to the IPs. In one particular embodiment, speech recognition circuitry included in a control IP is used to provide speech recognition functionality when interacting with various IPs to which the subscriber was connected under control of the control IP. Thus the benefits of speech recognition capability can be provided to multiple IPs without the need for each individual IP to implement speech recognition functionality.

30 Claims, 9 Drawing Sheets

U.S. PATENT DOCUMENTS

| | | | |
|---|---|---|---|
| 4,979,206 | 12/1990 | Padden et al. | 379/67 |
| 5,003,584 | 3/1991 | Benyacar et al. | 379/119 |
| 5,007,081 | 4/1991 | Schmuckal et al. | 379/354 |
| 5,036,533 | 7/1991 | Carter et al. | 379/59 |
| 5,042,063 | 8/1991 | Sakanishi et al. | 379/88 |
| 5,046,088 | 9/1991 | Margulies | 379/211 |
| 5,054,053 | 10/1991 | Sakanishi et al. | 379/63 |
| 5,091,947 | 2/1992 | Ariyoshi et al. | 381/42 |
| 5,128,982 | 7/1992 | Dugdale et al. | 379/89 |
| 5,148,471 | 9/1992 | Metroka et al. | 379/58 |
| 5,150,399 | 9/1992 | Yasuda | 379/67 |
| 5,165,095 | 11/1992 | Borcherding | 379/88 |
| 5,181,237 | 1/1993 | Dowden et al. | 379/88 |
| 5,297,183 | 3/1994 | Bareis et al. | 379/59 |
| 5,315,649 | 5/1994 | Foster et al. | 379/355 |
| 5,319,703 | 6/1994 | Drory | 379/351 |
| 5,325,421 * | 6/1994 | Hou et al. | 379/88.03 |
| 5,335,261 | 8/1994 | Fujinaka | 379/58 |
| 5,365,574 | 11/1994 | Hunt et al. | 379/88 |
| 5,369,685 | 11/1994 | Kero | 379/67 |
| 5,371,779 | 12/1994 | Kobayashi | 379/58 |
| 5,375,164 | 12/1994 | Jennings | 928/381 |
| 5,384,833 | 1/1995 | Cameron | 379/67 |
| 5,390,278 | 2/1995 | Gupta et al. | 395/2.52 |
| 5,404,422 | 4/1995 | Sakamoto et al. | 395/2.41 |
| 5,406,618 | 4/1995 | Knuth et al. | 379/67 |
| 5,420,912 | 5/1995 | Kopp et al. | 379/63 |
| 5,425,128 | 6/1995 | Morrison | 395/2.52 |
| 5,428,608 | 6/1995 | Freeman et al. | 370/60.1 |
| 5,452,289 | 9/1995 | Sharma et al. | 370/32.1 |
| 5,457,770 | 10/1995 | Miyazawa | 395/2.64 |
| 5,463,677 | 10/1995 | Bash et al. | 379/88 |
| 5,463,685 | 10/1995 | Gaechter et al. | 379/207 |
| 5,463,715 | 10/1995 | Gagnon | 395/2.76 |
| 5,583,920 * | 12/1996 | Wheeler, Jr. | 379/88.01 |
| 5,712,903 * | 1/1998 | Bartholomew et al. | 379/88.25 |
| 5,715,294 | 2/1998 | Pester | 379/34 |
| 5,719,921 | 2/1998 | Vysotsky et al. | 379/88 |
| 5,742,905 * | 4/1998 | Pepe et al. | 455/461 |
| 6,002,750 * | 12/1999 | Ertz | 379/88.12 |
| 6,061,432 * | 5/2000 | Wallace et al. | 379/88.18 |
| 6,069,890 * | 5/2000 | White et al. | 370/352 |
| 6,088,439 * | 7/2000 | Martz et al. | 379/230 |

\* cited by examiner

CONTROL IP DATABASE 310

| ↓1 | ↓2 | ↓3 | ↓4 | ↓5 | ↓6 | ↓7 | ↓8 | ↓9 |
|---|---|---|---|---|---|---|---|---|
| SUBSCRIBER NAME(S) | SUBSCRIBER ID | SUBSCRIBER TELEPHONE NUMBER | PIN | NFA PROTOCOL STATUS | MESSAGE WAITING STATUS | MESSAGE PROMPT | VD | T/R |
| JOHN SMITH | 1345444 | 712-3425 | 7865 | DISABLED | NONE | NONE | N | N |
| MARY WELLS | 2346474 | 712-5433 | 1256 | ENABLED | VMIP1 | DEFAULT | N | N |
| JACK BRADLEY | 3215643 | 713-2289 | 9649 | ENABLED | NONE | NONE | Y | TR |
| . | . | . | . | . | . | . | . | . |
| BOB BARKER | 4312398 | 713-3345 | 1111 | ENABLED | VMIP2/ VMIP1 | DEFAULT | Y | TR |
| JILL & FRANK LANE | 5123451 | 712-7678 | 8976 | ENABLED | VMIP2 | MESSAGE FOR | N | N |

FIGURE 3B

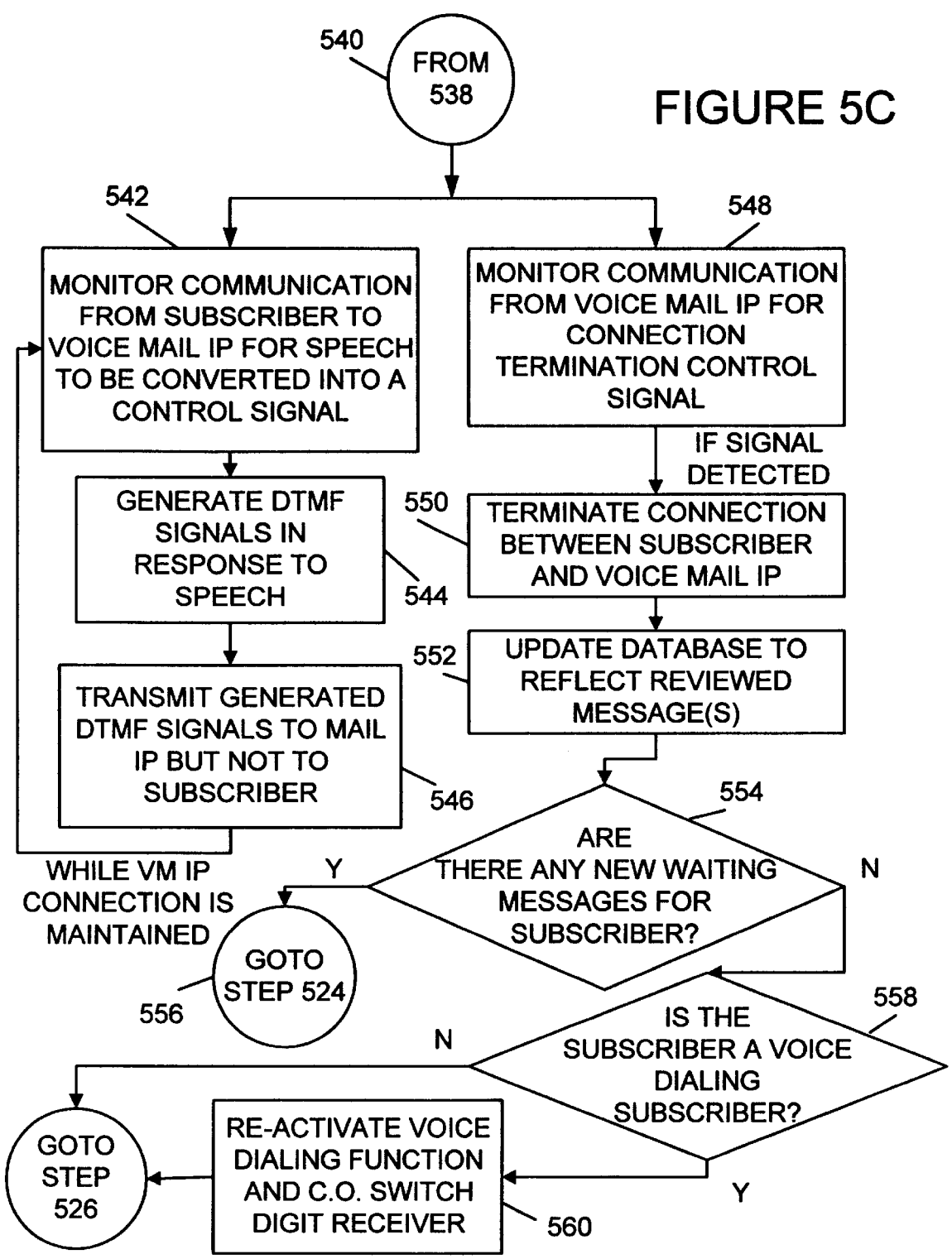

METHODS AND APPARATUS FOR INCREASING THE UTILITY AND INTEROPERABILITY OF PERIPHERAL DEVICES IN COMMUNICATIONS SYSTEMS

FIELD OF THE INVENTION

The present invention is directed to communications systems and, more particularly, to methods and apparatus for increasing the utility and interoperability of peripheral devices, e.g., voice mail devices and speech recognition platforms, used in communications systems.

BACKGROUND OF THE INVENTION

In telephone systems, electronic switches are used to route calls to their destination, e.g., as designated by a destination telephone number. They are also used to connect telephone service subscribers to various peripheral devices, such as, e.g., voice messaging systems (also sometimes referred to as voice mail systems), speech recognizers, voice dialing services, etc. Peripheral devices are usually provided with some degree of intelligence, e.g., logic in the form of a CPU, so that the subscriber and peripheral device can communicate in an interactive fashion and/or to enable the peripheral device to interact with the switch in a meaningful way. Peripheral devices with such built in intelligence are frequently referred to as intelligent peripherals or "IPs".

FIG. 1 illustrates a known telephone system 100 which supports voice mail services. The known system 100 includes first and second telephone networks 10, 11 coupled together by a fiber optic connection 32. Each of the telephone networks 10, 11 includes a plurality of telephones 12, 14, a central office (C.O.) switch 16 and first and second voice mail IPs 28, 30. As illustrated the switch 16 includes first and second interfaces 18, 24, a central processing unit (CPU) 20, memory 22 and digit receiver 26. As discussed below, the C.O. switch 16 is capable of connecting a telephone to a voice mail IP 28, 30 or one of the other telephones 12, 14. The central office switch 16 is coupled to each voice mail IP 28, 30 by a Ti link and a simplified message desk interface (SMDI) connection. The voice mail IPs 28, 30 can indicate to the central office switch 16 that a message is waiting for a particular subscriber and that the subscriber's message waiting light should be activated in the event that the particular subscriber's telephone 12, 14 includes message waiting light functionality.

One common technique for providing telephone service subscribers access to an IP, which provides a desired service, involves the subscriber dialing a telephone number corresponding to the IP. For example, when a subscriber to a voice mail service desires to check for received messages in one known system the subscriber would normally dial a telephone number corresponding to the subscriber's voice mail service. In response to detecting the telephone number corresponding to the voice mail IP, the C.O. switch 16 couples the voice mail subscriber to the voice mail IP 28 or 30 as indicated by the dialed telephone number. In addition to dialing the telephone number of the voice mail service, a subscriber may also have to enter into the telephone, e.g., by depressing a series of keys, account number and/or a personal identification number (PIN) required by the voice mail IP to gain access to the subscriber's account.

In the case of multi-party mail box accounts, once access to a voice mail account is obtained, the mail service may request that the subscriber depress one or more keys to identify which particular individual is attempting to retrieve his or her messages. For example, the caller may be asked to press "1" for John's messages or "2" for Mary's messages. Such mail systems may require a subscriber to enter, e.g., 10–20 keys, prior to the subscriber being informed as to whether or not there are any stored messages for the particular calling subscriber.

In addition to requiring a caller to enter account information, most voice mail systems may require the subscriber to press additional keys and thereby generate DTMF tones, e.g., to replay or delete a message.

The large number of keys which must be depressed, and thus the relatively large amount of time and effort required merely to discover whether a message is waiting for a subscriber, is a major disadvantage of the known mail system described above.

In order to facilitate the routing of calls to an IP, e.g., for providing voice mail and voice dialing services, a communication protocol referred to as the network facility access ("NFA") protocol, was designed for communicating information between a subscriber and an IP via a central office switch. This protocol overcomes the need for a subscriber to dial a telephone number to be connected to an IP when calling from the subscribers own telephone.

When the NFA protocol is enabled at the central office switch for a subscriber's telephone line, upon detecting an off-hook condition on the subscriber's line the central office switch will immediately establish a connection between the subscriber and an IP which is specified at the central office switch. In accordance with the NFA protocol, if the subscriber begins dialing a telephone number while the connection to the IP is being established, the central office switch will terminate the process of connecting the subscriber to the IP and route the call in the usual manner.

While use of the NFA protocol makes it easier for a subscriber to gain access to an IP by eliminating the need to dial a telephone number to be connected to the IP, there remains room for improvement in the manner in which subscribers are coupled to IPs and the manner in which IPs interact.

For the most part, subscribers to voice mail services usually want to be connected to a voice mail service when there is a new message waiting for them and not at other times. Accordingly, automatically coupling a subscriber to an IP which provides voice mail services in response to every off-hook condition of a subscriber can result in an inefficient use of switch and IP resources. This is because, in many if not most cases, the subscriber will be initiating the off-hook condition to place a call as opposed to connect to the voice messaging IP.

Problems may also arise with current methods of automatically connecting a telephone customer to an IP in response to an office hook condition when the telephone customer subscribes to multiple services implemented on different IPs. In the known systems, a subscriber is generally capable of being coupled automatically to a single IP in response to an off-hook condition.

Accordingly, if a telephone customer subscribes to multiple telephone messaging services, e.g., one for work and one for personal use, using known techniques he may only be able to be automatically connected to one of the services upon detection of an off-hook condition. This may force, for example, a person trying to retrieve business voice mail messages to dial a telephone number corresponding to a work voice mail service when at home and the home voice mail service when at work to check for messages.

Additional complications may arise in the known systems when, for example, when a subscriber to a voice messaging service also subscribes to a voice dialing service implemented on a different IP than the voice messaging service. In such a case, connecting a caller automatically to the voice dialing service IP in response to an off-hook condition may be preferable to connecting the caller to the voice messaging IP since the subscriber will, in many cases, place calls more frequently than check for messages. Unfortunately, automatically connecting the subscriber to one IP will normally preclude automatic connection to the other IP thereby preventing a subscriber from automatically having access to services provided on multiple IPs.

From the above discussion it is apparent that there is a need for improved methods and apparatus for connecting subscribers to peripheral devices. In particular, there is a need for methods and apparatus which enable a subscriber to be automatically coupled to a plurality of IPs in response to an off-hook condition.

In addition, there is a need for methods of improving the use of switch and IP resources by selectively connecting subscribers to IPs when the subscriber is most likely to use or desire access to the service provided by the IP and not in response to every off-hook condition initiated by the subscriber.

In addition to improving the efficiency and ease of the subscriber to IP connection process, it is desirable that the interaction with IP's be simplified from a subscriber's perspective. For example, it is desirable that the number of telephone keys a subscriber must press to obtain a desired service be minimized.

It is also desirable, from a cost and implementation efficiency standpoint, that circuitry found in one IP not be duplicated in other IPs which will service the same subscribers. It is also desirable from a cost and implementation standpoint that IP resources be used in an efficient and cost effective manner thereby minimizing overall IP and telephone system hardware costs.

In view of the above, it is apparent that there remains room for considerable improvement in how IPs are connected to subscribers, the way in which they are interconnected, and the actual manner in which IPs are implemented.

SUMMARY OF THE PRESENT INVENTION

The present invention is directed to methods and apparatus for increasing the utility and interoperability of peripheral devices, e.g., voice mail devices and speech recognition platforms, used in communications systems such as telephone systems.

In accordance with one embodiment of the present invention, a control IP is used to control the interaction of various IPs in the system and to control user access to the various IPs.

As discussed above, it is desirable that a subscriber be able to obtain messages from the subscriber's voice mail services regardless of which IP the messages reside upon without requiring the subscriber to dial a telephone number corresponding to the voice mail IP. However, at the same time, it is desirable from a telephone system efficiency standpoint that the subscriber not be automatically connected to a voice mail IP in response to every off-hook condition but rather when new messages are waiting for the subscriber.

In accordance with one embodiment of the present invention, the central office switch to which a subscriber is connected is dynamically controlled, in response to IP status information, to automatically connect a subscriber in response to an off-hook condition. In such an embodiment, the C.O. switch is controlled to connect the subscriber to an I.P. when the subscriber is likely to desire the services provided by the IP but not at other times. In one particular embodiment, this is achieved by having an IP, e.g., a control IP, signal the C.O. switch to enable/disable use of the NFA protocol on a subscriber's line in response to IP status information. The IP status information may include, e.g., message waiting information provided from a voice mail IP to a control IP though use of an SMDI line or a digital data/control line.

The present invention, uses a control ID, in order to enable a subscriber to voice mail services implemented on multiple IPs automatic access, in response to an off-hook condition to the IPs when messages are waiting. Upon detecting an off-hook condition, when the NFA protocol is enabled, the C.O. switch will automatically connect a subscriber to the control IP. Through the use of a switching matrix, the subscriber is then connected, e.g., sequentially, to one or more IPs which provide, e.g., voice mail services to the subscriber.

In one embodiment, in order to reduce the amount of input required by a subscriber, the control IP, as part of establishing a connection between the subscriber and voice mail IP, automatically provides stored subscriber account number and pin number information to the voice mail IP. Accordingly, the subscriber is provided, from the subscriber's phone, access to his/her messages without having to enter any information.

In order to further simplify interaction with service IPs, e.g., voice mail IPs, the control IP of the present invention includes speech recognition functionality. In one embodiment, the connection between the subscriber and the service IP is monitored by the control IP. Numbers and/or commands spoken by the subscriber are recognized and converted into DTMF tones which are commonly used for controlling service, e.g., voice mail, IPs. In this manner, interaction with voice mail IPs is simplified from the subscriber's perspective since the subscriber can orally select certain options by, e.g., saying "one" as opposed to having to press a number on a telephone keypad.

Using the control IP to perform speech recognition for multiple service IPs has the advantage of allowing the same speech recognition hardware to service multiple IPs. Thus, in accordance with the present invention the need to implement speech recognition hardware for which speech interactions is to be supported, in each individual IP is eliminated.

In one particular embodiment, the functionality of a voice dialing IP and a control IP are merged. In such an embodiment, the control IP performs the above discussed control operations as well as provides voice dialing functionality. The control functionality of a control IP may also be merged with that of a voice mail system if desired.

In order to provide speech recognition capabilities in a cost effective manner, in one embodiment of the present invention, the speech recognition circuits which are used during different portions of a call are varied. In this manner, the least powerful and thus least costly available speech recognition circuit capable of performing the necessary speech recognition operation at any given time is used. In one particular embodiment, this involves switching, upon connection to a voice mail IP, from a speech recognition circuit capable of performing speaker independent and speaker dependent speech recognition, to one that can perform only speaker independent speech recognition, e.g., of numbers and a few keywords or phrases.

In another embodiment, the amount of processing time allocated for performing speech recognition for an individual subscriber is dynamically varied as a function of the stage of the call. In one such embodiment, more processing time is allocated for speech recognition when voice dialing is being performed than when instructions, in the form of numbers, are being provided to a voice mail IP. Such an embodiment is particularly well suited where a single processor is used on a time shared basis to provide speech recognition functionality to multiple connected subscribers at the same time.

In still yet another embodiment, a plurality of speech recognition circuits are employed with differing speech recognition capabilities and therefore different individual implementation costs. In one such embodiment, the system includes a high end speech recognition circuit, e.g., a large vocabulary speaker independent speech recognition circuit, a medium cost speech recognition circuit, e.g., a combined speaker independent and speaker dependent speech recognition circuit capable of identifying a vocabulary of, e.g., 50 words, and a low end, e.g., small vocabulary, speaker independent speech recognition circuit capable of identifying, e.g., 20 spoken numbers, phrases or words. A single speech capture and segmentation circuit is used with the various speech recognition circuits avoiding the need to duplicate such circuitry for each speech recognition circuit. In one such embodiment, a service code received from the C.O. switch is used to determine the most appropriate, in terms of cost efficiency, of the various available speech recognizers to use.

In another embodiment, the captured speech is monitored by a default speech recognition circuit, e.g., the combined speaker independent and speaker dependent speech recognition circuit. During a call, the one of the plurality of speech recognition circuits, performing the speech recognition task, monitors for keywords or phrases used as a trigger in selecting which one of the speech recognition units should be used at any given time. For example, in one such embodiment detection of the phrase "corporate directory" by the combined speaker independent and speaker dependent speech recognition circuit will result in the large vocabulary speaker independent speech recognition circuit being substituted for the combined speech recognition circuit. By dynamically switching between speech recognition circuits in response to such voice triggers, switching between speech recognition circuits can occur on-the-fly with multiple switches between speech recognition circuits occurring during a single phone call in a manner that is transparent to the caller.

Using such a speech recognition system according to the present invention to service a large number of telephone subscribers in parallel allows the number of relatively powerful and therefore costly high end speech recognition circuits to be minimized when servicing a given number of subscribers. Such a desirable result is achieved while still providing callers a high quality speech recognition service since the recognition circuit's capabilities are matched to each particular caller's detected speech recognition needs at any given time.

By providing a speech recognition capability in accordance with the present invention, numerous callers can be provided speech recognition service in parallel at a lower cost than if all of the customers were serviced by high end speech recognizers at all times.

In addition to the above described features, many other features and embodiments of the present invention are described in detail below.

BRIEF DESCRIPTION OF THE DRAWINGS

FIG. 3B is a database suitable for use as the database of the control IP illustrated in FIG. 3A.

FIGS. 5A–5C are flow charts illustrating a method of operating the control IP of FIG. 2 in accordance with one embodiment of the present invention.

DETAILED DESCRIPTION

As discussed above, the present invention relates to methods and apparatus for increasing the utility and interoperability of peripheral devices, e.g., voice mail devices and speech recognition platforms, used in communications systems, e.g., telephone systems.

Figure 1:
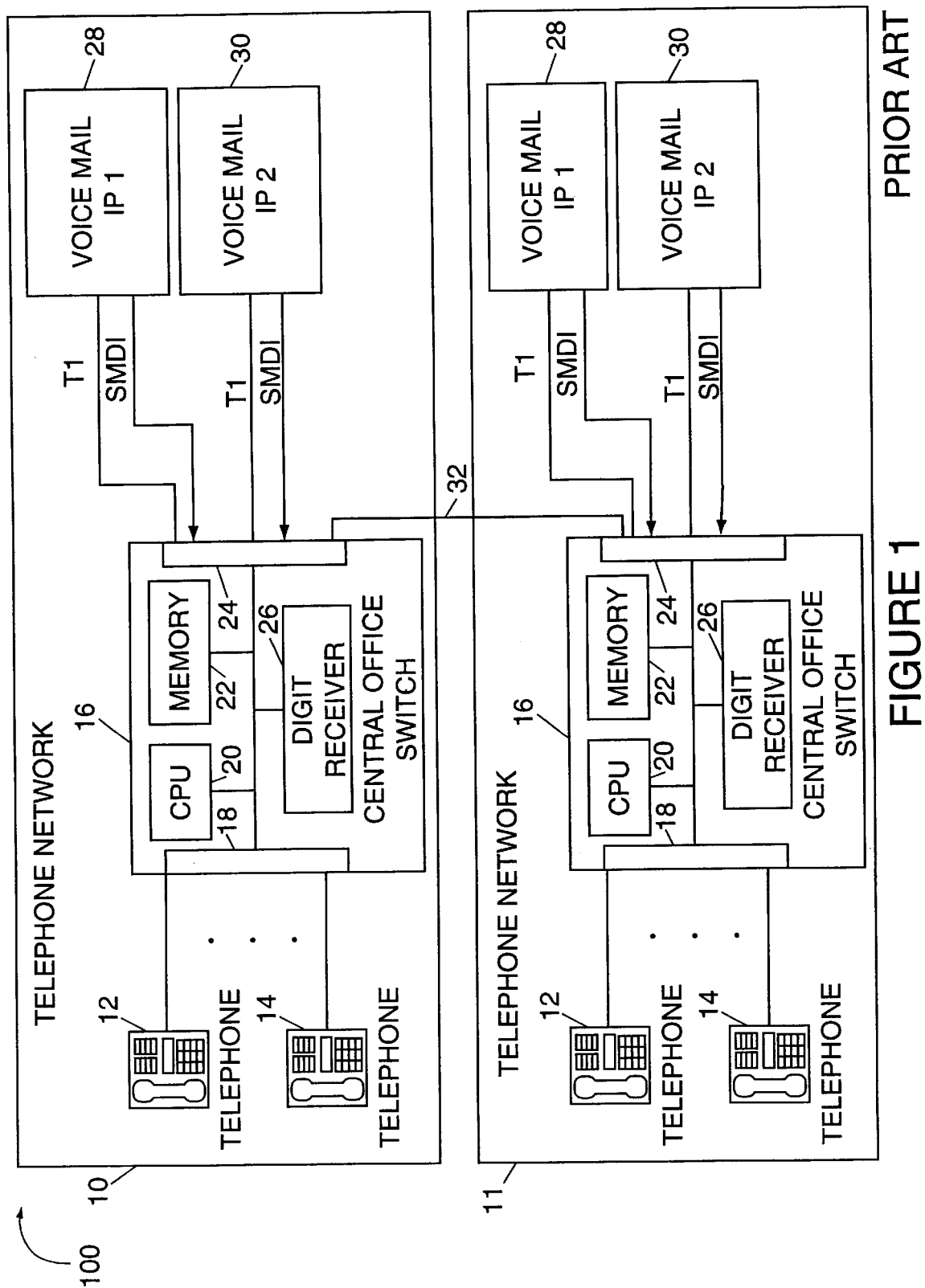
FIG. 1 is a block diagram of a known telephone system including IPs for providing telephone users with voice mail service.
Figure 2:
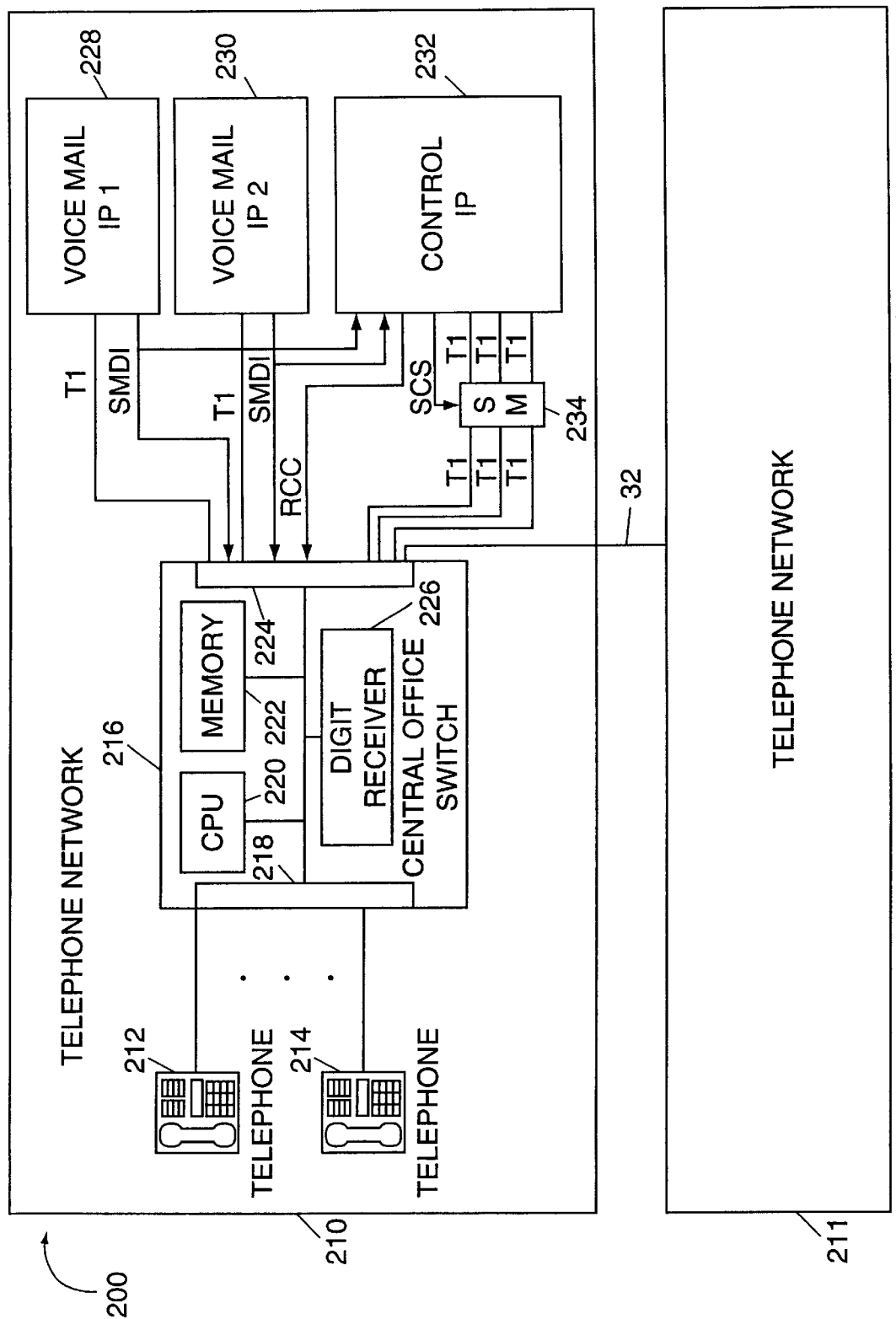
FIG. 2 is a block diagram of a telephone system implemented in accordance with one embodiment of the present invention.

FIG. 2 illustrates a telephone system 200 implemented in accordance with one exemplary embodiment of the present invention. As illustrated the telephone system 200 includes a plurality of telephone networks 210, 211 which are coupled together by a fiber optic connection 32. The first telephone network 210 is illustrated in detail in FIG. 2. The second telephone network 211 may be the same as the first telephone network 210 or, e.g., a known telephone network, e.g., the network 10 of FIG. 1. While two telephone networks are shown in the FIG. 2 embodiment, it is to be understood that the system may comprise any number of networks 210, 211 and/or other additional communications networks which provide, e.g., Internet services.

As illustrated in FIG. 2, the telephone network 210 includes a plurality of telephones 212, 214, a C.O. switch 216, a first voice mail IP 228, a second voice mail IP 230, a control IP 232 and a switching matrix 234. The telephones 212, 214 are coupled to the central office switch 216 via a first interface 218. Each telephone 212, 214 corresponds to a telephone subscriber who, in addition to subscribing to basic telephone service may also subscribe to one or more additional services such as voice mail and/or voice dialing services provided though the use of IPs 228, 230, 232.

The switch's interface 218 is coupled by a local bus to a CPU 220, memory 222, digit receiver 226 and a second interface 224. The CPU 220 controls call routing and other switch operations in response to inputs received via the first and second interfaces 218, 224 in accordance with program routines stored in the memory 222.

The digit receiver 226, when active, detects the receipt of DTMF tones and converts them to digits which are supplied to the CPU 220 for, e.g., call routing purposes. The switch 216 is capable of implementing the known NFA protocol for communicating between one or more of the telephones 212, 214 coupled thereto and one or more of the IPs 228, 230, 232. In one embodiment, the switch 216 is a Class V digital communications switch.

The switch 216 is coupled to each one of the first and second voice mail IPs 228, 230 via its second interface 224, and one or more T1 links and SMDI lines. A voice and/or data connection can be established between a subscriber operating one of the telephones 212, 214 and either the first or second voice mail IPs 228, 230 using one of the T1 links. The SMDI links between the voice mail IPs 228, 230 and the C.O. switch 216 are used to notify the central office switch when a new message has been received and is waiting for a particular subscriber corresponding to one of the telephones 212, 214 coupled to the central office switch. The central office switch uses the SMDI information to activate a message waiting light on the particular subscriber's telephone 212, 214, when such message waiting functionality is supported by the telephone 212, 214.

In accordance with the present invention, the SMDI lines of the first and second voice mail IPs 228, 230 are also coupled to SMDI inputs of the control IP 232. In this manner, the control IP 232 receives information regarding messages which are waiting for a voice mail subscriber at the voice mail IPs, 228, 230.

In addition to being coupled to the voice mail IPs 228, 230, the control IP 232 is coupled to the C.O. switch 216 by a recent change channel (RCC) and a plurality of T1 links. The T1 links are routed through the switching matrix 234. The switching matrix 234 is controlled by a switching control signal (SCS) received from to the control IP 232. Though use of the SCS the control IP 232 can control the routing of incoming and outgoing lines to establish a connection to anyone of a plurality of line termination points including the first and second voice mail IPs 228, 230 and telephones 212, 214.

Where communication protocol conversion is required, the switching matrix 234 may be replaced by a programmable switch such as those made by the Summa Four Corporation.

Figure 3A:
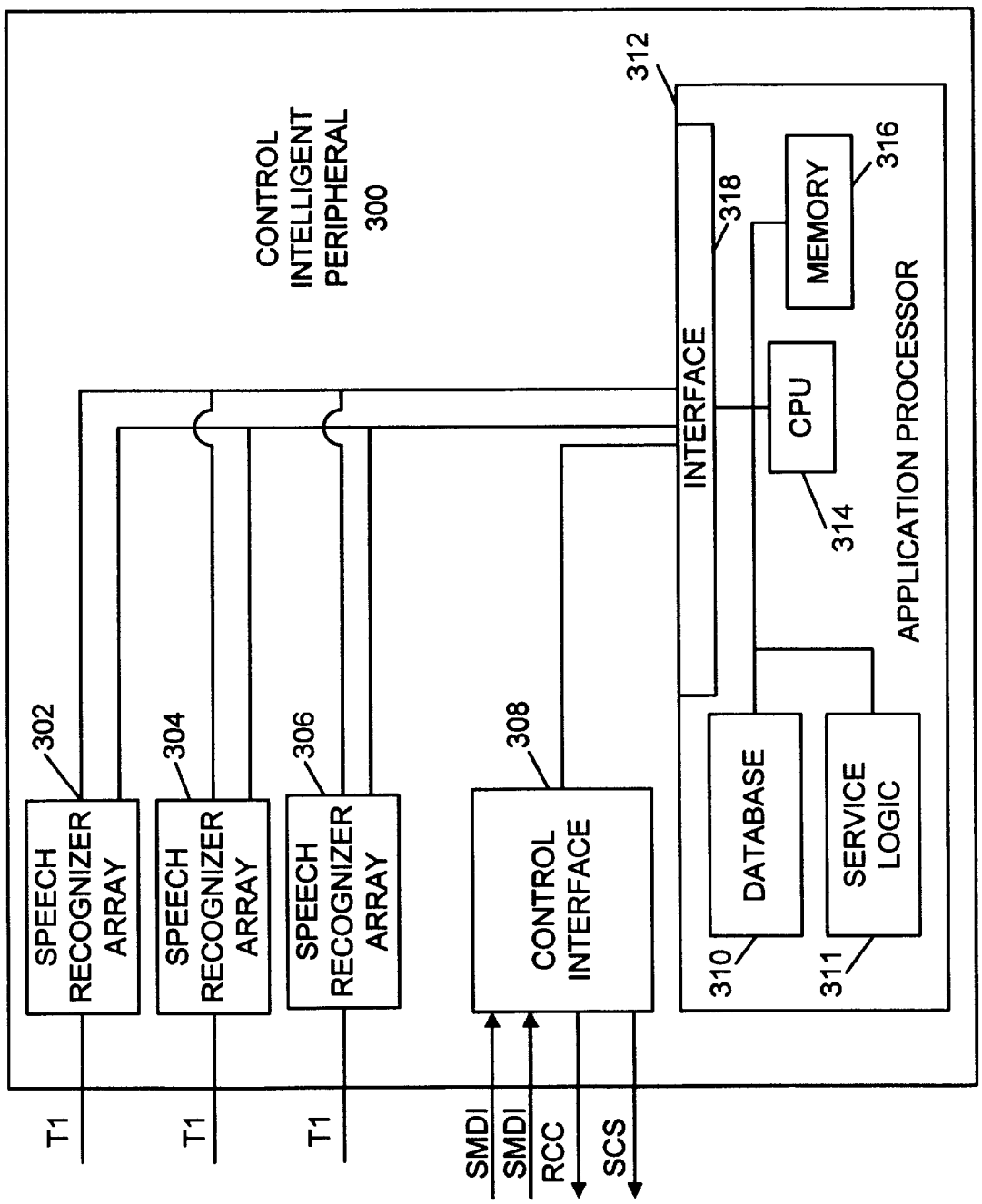
FIG. 3A is a block diagram of an intelligent peripheral implemented in accordance with one embodiment of the present invention.

FIG. 3A illustrates a control IP 300 suitable for use as the control IP 232 of the system 200. As will be discussed in detail below, in accordance with the present invention, the control IP 300 may be used to support voice dialing services in addition to switch and call routing control functions.

As illustrated, the control IP 300 comprises a plurality of speech recognizer arrays, 302, 304, 306, a control interface 308, and an application processor 312. Each of the speech recognizer circuits 302 is coupled to at least one T1 link for receiving and transmitting voice and data to and from the switch 216. Each of the speech recognizer arrays 302, 304, 306 is also coupled to an interface 318 of the application processor 312.

The application processor 312, includes the interface 318, a CPU 314, and a plurality of data storage devices including a memory 316, a database 310, and service logic 311. The memory 316 stores instructions in the form of a program as well as data about the speech recognizer arrays 302, 304, 306 and the speech recognition capabilities of various circuits included therein. The service logic includes data and program code used to implement one or more services, e.g., a voice dialing service. The program stored in the memory 316, in conjunction with the information and program code stored in the service logic 311, when executed by the CPU 314, controls the operation of the control IP in accordance with the present invention. The interface 318 is used to couple and interface the various components of the application processor, such as the database 310, CPU 314, memory 316 and service logic 311 to the speech recognizer arrays 302, 304, 306 and the control interface 308. The interface 318 converts the various signals received by the application processor 312 into a format that can be interpreted and processed by the CPU 314 as well as converts signals generated by the CPU 314 into a signal format that can be used to control and interact with the various circuits coupled to the application processor 312.

The control interface 308 is responsible for receiving SMDI signal inputs from the voice mail IPs 228, 230 which form part of the network 210. The information regarding waiting messages, e.g., subscriber's account number and message waiting indicator, received via the SMDI links, is conveyed to the application processor 312. The application processor 312 is responsive to the information received via the SMDI links which it uses in conjunction with information from the database 310 to determine the action which is to be taken by the control±P 300. Via the control interface 308, the application processor can instruct; e.g., using the recent change channel (RCC), the C.O. switch 216, to enable/disable the NFA protocol on a particular subscriber's line and/or perform other operations such as enable/disable the C.O. switch's digit receiver 226 with regard to an ongoing connection. In addition, via the control interface 308, which generates the switching matrix control signal (SCS), the application processor 312 can control the switching matrix 234 to establish connections via the C.O. switch with one or more IPs and/or destination telephones.

The database 310, which is included in the application processor 312, is used to store relevant subscriber information. FIG. 3B illustrates an exemplary control IP database 310.

As illustrated, the database 310 comprises a plurality of entries. One set of entries, represented by a horizontal row, is associated with each subscriber being serviced by the control IP 232. Each set of entries includes information pertinent to servicing one subscription which, in most cases, will correspond to a single individual subscriber. However, in the case of a multi-party mailbox, the single subscription may correspond to multiple individuals.

In the FIG. 3B embodiment, columns 1–9 represent different information entries which are maintained in the database 310 for each subscription. Column 1, corresponds to subscriber name information, column 2 corresponds to a subscriber ID number. The subscriber ID number may be, e.g., a number used to identify the subscriber for voice mail purposes. Column 3 corresponds to subscriber telephone number information. The telephone number information may be used, e.g., to identify to the C.O. switch 216, the line on which the NFA protocol is to be enabled/disabled. In addition, in the case where the SMDI link provides message waiting information associated with a subscriber's telephone number, the control IP 232 can identify the particular subscriber for which a message is waiting by using the received telephone number and the telephone number information stored in the database 310.

Column 4 of the database 310 corresponds to the subscriber's personal identification number (PIN) which the subscriber would normally use to access the messaging service or services to which the subscriber subscribes.

While, in columns 2 and 4 only one subscriber and PIN is shown for each subscriber, it is to be understood that a different subscriber ID and PIN may be stored for each one of a plurality of messaging services to which a customer subscribers.

Columns 5, 6, 7, and 8 include status and service information used by the IP 232 in determining how to control call routing, e.g., which IPs a customer should be connected to, and what services are to be provided to a customer.

Column 5, corresponds to NFA protocol status. If the NFA protocol is enabled for a particular subscriber, the subscriber will automatically be coupled to the control IP 232 when the C.O. switch detects an off-hook condition on the subscriber's line.

If the NFA protocol is not enabled for a particular subscriber, that subscriber will not be automatically connected to the control IP when an off-hook condition is initiated. Under such circumstances, the subscriber would have to dial the number of an IP to gain access to his or her voice mail service or other IP provided service.

Database column 6 corresponds to message waiting status. If a message is waiting for a particular subscriber, e.g., as indicated by the receipt of an SMDI signal including the subscriber's telephone number, this column will include an IP identifier identifying the IP where a message is waiting. In the event that messages are waiting on multiple IPs for a subscriber, the entry in column 6 associated with the subscriber will include an IP identifier for each IP with a waiting message.

Database column 7 indicates the type of message prompt to be played to the subscriber once a connection is established between the subscriber and the control is. In the case where no message is waiting, a message that there are no waiting messages is played to the subscriber in the event that the subscriber connects to the control IP, e.g. by dialing the IP. Accordingly, in column 7, "NONE" is indicated with regard to the prompt that should be used for subscribers without waiting messages. In the case where a voice message is waiting for an individual subscriber to an individual voice mail service, default message is played to the subscriber upon connection to the IP. The default message may be something like "You have at least one new message." In at least one embodiment the default message provides a user with the actual number of new waiting messages. In the case where the voice mail service being provided corresponds to a multi-party account, as in the case of the last account listed in database 310, a prompt identifying the individual for whom the waiting message is intended may be played when such information is available. For example, in one embodiment the prompt which is played states: "NEW MESSAGE FOR: NAME" where NAME is the name of the individual to whom the waiting message is directed. When individual name information is not available regarding the intended recipient of a waiting message the default message prompt may be used.

Column 8 indicates whether the customer subscribes to a Voice Dialing service supported by the control IP 232. As will be discussed below, this information is important with regard to call flow handling by the control IP 232. Normally, for voice dialing service subscribers, the NFA protocol feature will be enabled at the central office switch 216 even when messages are not waiting for the subscriber. This allows the subscriber to obtain direct access to the voice dialing capability of the control IP without having to dial the IP.

As discussed above, in the case where a customer subscribes to a voice mail service but not a voice dialing service, the NFA protocol feature is disabled in accordance with the present invention at the C.O. switch when there are no messages waiting for the subscriber.

Column 9 includes voice template and voice recording information (TR) used for supporting voice dialing services for subscribers to the voice dialing service. For each voice dialing service subscriber, at least one speaker dependent speech recognition template is stored for each name to be recognized using speaker dependent speech recognition techniques. A recording of the name corresponding to a speech template, e.g., made when the template was created, is also stored in the database 310 so that it can be played back to the subscriber as a way of indicating to the caller which name was identified by the speech recognition circuit. A telephone number, to be dialed, is also normally stored in the database 310 for each name for which there is a stored template.

With regard to customer John Smith, columns 5–9 of the first row of database 310 indicate, for example, that the NFA protocol is not enabled for his telephone line, that there are no messages waiting for him, that a prompt is to be played to John Smith indicating that there are no waiting messages in the event that he establishes a connection with the control IP, e.g., via a direct dial operation, that he does not subscribe to the control IP's voice dialing service, and that there are no stored templates or recordings for John Smith.

With regard to customer Mary Wells, columns 5–9 of the second row of database 310 indicate, for example, that the NFA protocol is enabled for her telephone line, that there is one or more messages waiting for her on the first voice mail IP 228, that a default prompt is to be played to her indicating that there are one or more waiting messages in the event that she establishes a connection with the control IP, e.g., via initiating an off-hook condition on the telephone line identified by the telephone number listed in database 310, that she does not subscribe to the control IP's voice dialing service, and that there are no stored templates or recordings for her.

Figure 4:
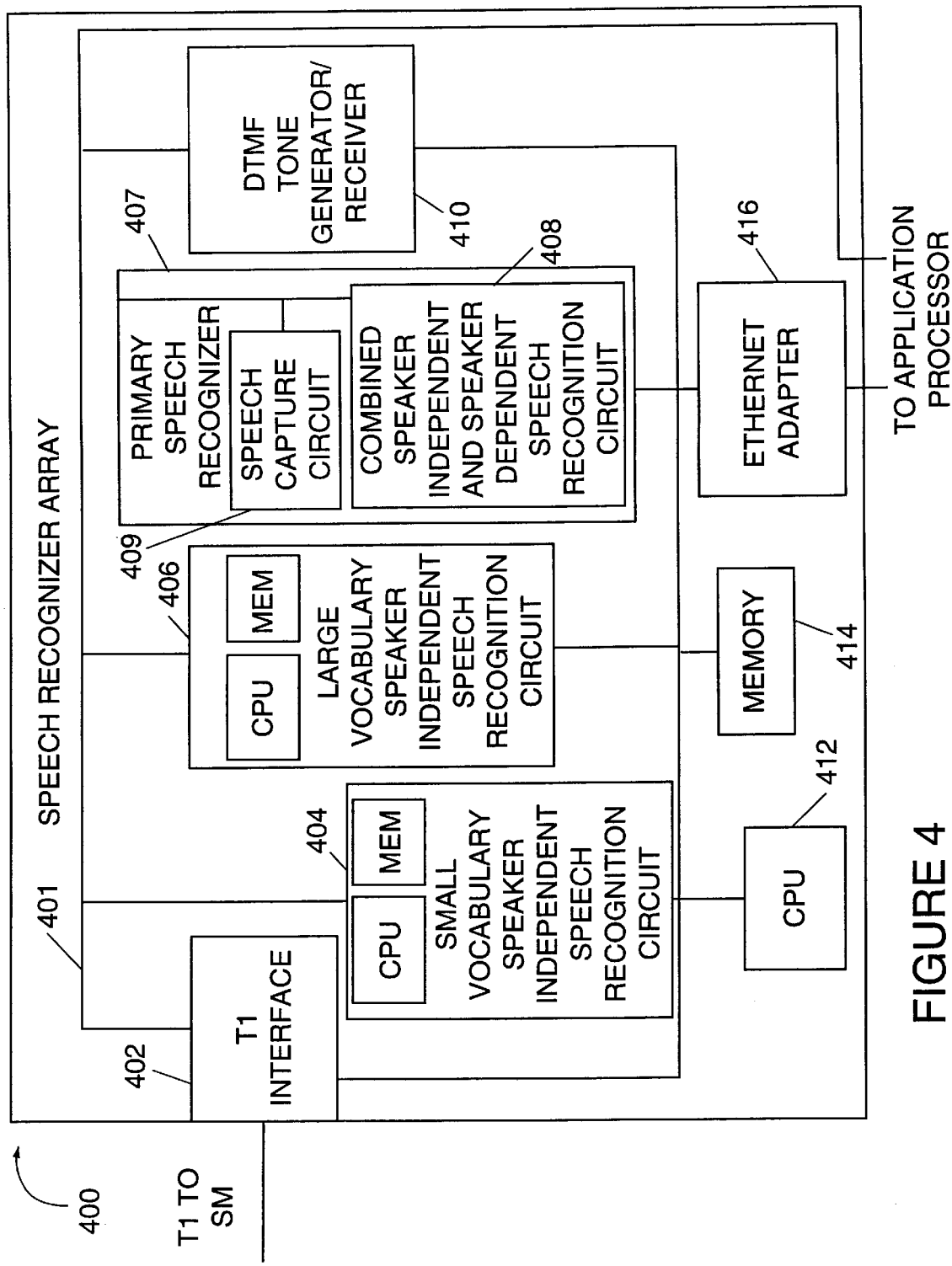
FIG. 4 is a block diagram of a speech recognizer array implemented in accordance with one embodiment of the present invention.

FIG. 4 illustrates a speech recognizer array 400 suitable for use as any one of the speech recognizer arrays 302, 304, 306. The speech recognizer array 400 includes a T1 interface for coupling the recognizer array to a T1 link, first and second speaker independent speech recognition circuits 404, 406, a primary speech recognizer 407 and a DTMF tone generator/receiver 410. These circuits 402, 404, 406, 407, 410 are coupled together by a data bus 403 and a high bandwidth bus 401 capable of carrying voice communications. The high bandwidth bus 401 is also coupled to the control IP's application processor 312.

The data bus 403 couples a CPU 412, memory 414 and an Ethernet adapter 416 to the data bus 403 thereby allowing them to interact with the various speech recognition circuits 404, 406, 408, T1 interface 402 and DTMF tone generator/receiver 410. The Ethernet adapter 416 is used to couple the data bus 403 to the application processor 312.

The primary speech recognizer 407 includes a speech capture circuit 409 and a combined speaker independent and speaker dependent speech recognition circuit 408. The speech capture circuit 409 is used to collect speech data and to arrange it into segments which are then supplied to one of the speech recognition circuits 404, 406 or 408 for processing. By coupling the various speech recognition circuits 404, 406, 408 and the speech capture circuit 409 to the same high speed bus 401, the speech capture circuit 409 can transmit captured speech to any of the voice recognition circuits 404, 406, 408 thereby eliminating the need to provide a separate speech capture circuit 409 for each of the speech recognition circuits 404, 406, 408.

Each of the speech recognition units 404, 406, 408 include a processor and memory which are used to perform speech recognition operations. The large vocabulary speaker independent speech recognition circuit 404 may support, e.g., the recognition of, e.g., over 100 words or phrases using speaker independent speech recognition techniques. The combined speaker independent and speaker dependent speech recognition circuit may support, e.g., the recognition of 20–75 words or phrases. In contrast, the small vocabulary speaker independent speech recognition circuit may support the recognition of 20 or fewer words, e.g., spoken numbers or keywords, which may be included in phrases.

Because of the relative complexity of the speech recognition tasks to be performed, the large vocabulary recognition circuit 406 will normally be implemented using a relatively powerful CPU and a large amount of memory. The combined speaker independent and speaker dependent speech recognition circuit 408 will normally be implemented using a less powerful CPU and less memory than the speech recognizer 406 while the small vocabulary speaker independent speech recognition circuit 404 will normally be implemented using the least amount of memory and the least powerful CPU out of the three speech recognition circuits 404, 406, 408. The recognition circuit 404, uses the least powerful CPU and least memory because it needs to perform the least processing operations per unit time, out of the three recognizer circuits, for each caller being serviced to perform real time speech recognition. In contrast, the large vocabulary recognition circuit 406 has to perform the most processing operations, out of the three circuits 404, 406, 408, per caller per unit time, to perform real time speech recognition and therefore includes the most powerful CPU out of the speech recognition circuits 404, 406, 408.

The large vocabulary speaker independent speech recognition circuit 406 is capable is capable of detecting a large number of names and phrases using speaker independent speech recognition techniques. For this reason, it is particularly well suited for, e.g., providing corporate directory information where it is desirable to be able to identify hundreds or even thousands of names of individual people and words which are, e.g., part of the name of a corporate department title. The large vocabulary speech recognition circuit 406 may be thought of as a high end, e.g., relatively expensive and powerful, speech recognition circuit.

The small vocabulary speaker independent speech recognition circuit 404 supports the recognition of relatively few words or phrases, e.g., less than 20. In one embodiment the circuit 404 is used to recognize numbers spoken as part of a phrase such as "press number". In addition, in various embodiments, it is used to recognize words which may be interpreted as a trigger to switch to the use of another voice dialing circuit.

The combined speaker independent and speaker dependent speech recognition circuit 408 may be characterized as a mid-level speech recognition circuit capable of recognizing, e.g., up to 100 words or phrases in one exemplary embodiment. The circuit 408 is particularly well suited for voice dialing purposes and may be the same as or similar to the speech recognition circuit described at length in U.S. Pat. No. 5,719,921 which is hereby expressly incorporated by reference.

The combined speaker independent and speaker dependent speech recognition circuit 408 is used, in one embodiment, to support voice dialing. Voice dialing generally involves performing speaker independent speech recognition used to identify commands, e.g., dial, forward, cancel call forward, and speaker dependent speech recognition to identify names, e.g., the names of the people to be called. See, U.S. Pat. No. 5,719,921 for a discussion of the use of speaker independent and speaker dependent speech recognition to support voice dialing services. In order to support speaker dependent voice dialing services speaker dependent speech recognition templates, e.g., of names are stored in the database 310 for each voice dialing service subscriber. This information is retrieved, stored in the memory of the speech recognition circuit 408, and used to support voice dialing, when a connection is established between the control IP 232 and a voice dialing service subscriber.

In accordance with one embodiment of the present invention, the speech recognition circuit 404, 406, 408 which is used to support speech recognition is dynamically changed according to the speech recognition task to be performed during the particular stage of a call. In this manner, hardware is used in a more cost effective manner than would be possible if an unnecessarily powerful, and therefore, relatively expensive, speech recognition circuit were used for all stages of call processing.

As will be discussed further below, in accordance with one embodiment of the present invention, the combined speaker independent and speaker dependent speech recognition circuit 408 is used during portions of a call where voice dialing is to be provided. However, during portions of a call where the detection of, e.g., spoken digits alone or as part of a phrase, is the primary concern, the small vocabulary speaker independent speech recognition circuit 404 is used. In cases where large vocabulary speaker independent speech recognition operations are required, e.g., providing corporate directory information, circuit 406 is used.

In accordance with the present invention, the dynamic switching between speech recognition units 404, 406, 408, as a call progresses and/or the service being provided the subscriber changes during a call, is performed under control of the application processor 312 and/or CPU 412.

In one particular embodiment, when a call connection is initially established with the control IP 232 a service code, e.g., a number indicating voice dialing, corporate directory, or a voice mail service request, is provided by the switch 216 to the control IP. Subsequently, a new service code may be supplied to the control IP during the same call connection, e.g., in response to the switch detecting the pressing of the * key followed by a number indicating a requested service such as voice mail service.

In one such embodiment, CPU 412 of the speech recognizer array detects the service code associated with a particular call connection and assigns one of the speech recognizer circuits 408, 406, 404 to service the call as a function of the service code. In the event that another service code is received during the same call connection, the CPU will re-assess the speech recognition circuit assignment in response to receipt of the new service code. Thus, as a result of receipt of a new service code, the speech recognizer assigned to service a call may be dynamically changed during the call. For example, if a voice dialing service code is initially received, the combined speaker independent and speaker dependent speech recognition circuit 408 would be assigned to service the call. If during the call a voice message service code were received, the CPU 412 would de-assign the combined speech recognizer and assign the small vocabulary speaker independent speech recognition to servicing the call.

In another embodiment, the call connection established with the control IP 232 is monitored throughout the period in which the call connection is maintained for spoken words or phrases, referred to herein as "trigger phrases" which may be used to determine the service to be performed and thus which speech recognizer is best suited for servicing a particular portion of a call. For example, detection of the phrase "corporate directory" would be interpreted as indicative of a corporate directory information request and, in response to detection of such a phrase, the large vocabulary recognition circuit 406 would be assigned to service the call. Detection of the word "DIAL" or a spoken name included in the caller's voice dialing database could be interpreted as indicating a voice dialing service request. In such an instance the combined speech recognition circuit 408 would be assigned to service the call. Similarly, the phrase "voice mail" would trigger use of the small vocabulary speech recognition circuit 404 to service the call.

Each of the speech recognition circuits 404, 406, 408 can use speaker independent speech recognition techniques to detect such keywords or trigger phrases. Accordingly, such keywords or trigger phrases can be detected at any point during a call causing the CPU 412 to reassess and possibly re-assign the call to a different one of the speech recognition circuits 404, 406, 408. In this manner the CPU 412 matches the requested service to the most cost effective one of the speech recognition circuits available.

Operation of the telephone system 200 of the present invention, and use of the control IP 232 will now be discussed in detail with reference to FIGS. 5A–5C which are a flow diagram illustrating the operations performed by the control IP in servicing a subscriber.

Operation of the control IP begins in step 502, the START step. In this step the control IP's application processor 312 is initialized, the IP control program stored in the memory 316 is loaded and executed by the CPU 314. Once various initialization procedures have been completed control IP operation proceeds to step 504. In step 504, the application processor 312, via the speech recognizer arrays 303, 304, 306 and control interface 308, monitors for inputs to the control IP, (e.g.) from either the SMDI lines or T1 links coupled to the control IP 232.

In step 506, a determination is made by the application processor as to whether or not an input has been detected. If no input has been detected operation proceeds once again to the monitoring step 504. If, however, in step 506, a message waiting indicator signal is detected, e.g., on one of the SMDI lines, operation progresses to step 508.

In step 508 the subscriber for which the message is intended is identified. This is accomplished by, e.g., using either a telephone number or subscriber ID received from the SMDI line in conjunction with a message waiting signal, with the corresponding subscriber information stored in the database 310. Once the subscriber for which the message is intended is identified, and the corresponding data base entries for the subscriber retrieved from the database 310, operation proceeds to step 510.

In step 510, a determination is made, e.g., from the data included in column 5 of the database 310, as to whether or not the NFA protocol is active at the C.O. switch for the identified subscriber for which the message is intended.

Active NFA protocol status at the switch for the identified subscriber will result in the identified subscriber being coupled automatically to the control IP 232 in response to the detection of an off-hook condition on the identified subscriber's line.

Normally, if there is already one or more waiting messages for the identified subscriber, not including the current message being reported by the detected signal on the SMDI line, the NFA protocol will be active for the identified subscriber as the result of the earlier unretrieved waiting messages. Similarly, if the subscriber subscribes to the voice dialing service supported by the control IP 232, the NFA protocol will be enabled for the subscriber.

If, in step 510 it is determined that the NFA protocol is already active for the identified subscriber, operation proceeds directly to step 514.

However, if in step 510 it is determined that the NFA protocol is not active for the subscriber at the C.O. switch operator proceeds to step 512 wherein a control signal is sent by the control IP to the C.O. switch, via the recent change channel (RCC). The control signal instructs the C.O. switch to connect the identified subscriber to the control I.P., in response to an off-hook condition on the identified subscriber's telephone line, e.g., by using the NFA protocol. From step 512, operation progresses to step 514.

Step 514 involves updating of the database 310 to reflect changes in the status information associated with the identified subscriber. This involves, e.g., changing the NFA status information if it was activated in step 512, and updating the message waiting and message prompt information to reflect the waiting message. For example, the message waiting status information in col. 6 may be updated to reflect that there is an additional waiting message for the identified subscriber and the VMIP where the message is waiting. In addition, the message prompt information, included in database column 7, will be modified, if necessary, so that the identified subscriber will be informed of the waiting message upon connecting to the control IP.

Once the subscriber database is updated in step 514, operation returns to the monitoring step 504 wherein the control IP monitors for additional inputs. From step 504, operation proceeds to step 506.

If, in step 506, a subscriber connection signal is detected as a result of the monitoring for received signals which occurred in step 504, operation proceeds to step 520 via flow chart connectors 516, 518. The subscriber connection signal will normally include information sufficient to identify the subscriber for database access purposes, e.g., the subscriber's telephone number or account number information. For purposes of this exemplary discussion, the exemplary individual subscriber who established the connection to the IP will be referred to as "the connected subscriber".

In step 520, the database 310 is accessed and the information included therein, pertinent to the connected subscriber, is retrieved. The retrieved information may include, e.g., in the case where the caller is a voice dialing service subscriber, speaker dependent voice dialing templates and recordings in addition to the other information illustrated in FIG. 3B.

Once the subscriber data is retrieved from the database 310, operation proceeds to step 522 wherein a determination is made, using the retrieved information, as to whether the connected subscriber is a voice dialing subscriber. If the answer to this inquiry is yes, operation proceeds to step 524 wherein the voice dialing service is provided to the caller. This step involves, e.g., loading retrieved speaker dependent speech recognition templates and recordings into the speech recognition circuit 408. It also involves controlling the recognition circuit 408 so that it monitors the line which connects the subscriber to the control IP and performs speech recognition operations on speech transmitted thereon.

Once the voice dialing service is activated, if the speech recognition circuit 408 receives an instruction to dial a telephone number over the line connecting the subscriber to the control IP 232, a voice dialing operation will be performed by the IP in a manner that is the same as or similar to the manner in which known voice dialing service is provided.

From step 524 operation proceeds to step 526. Operation will proceed directly from step 522 to step 526 if in step 522 it is determined that the connected subscriber is not a voice dialing subscriber.

In step 526, a determination is made from the retrieved database information, e.g., by the application processor 312, as to whether there are any new messages waiting for the connected subscriber. If there are no new messages, operation proceeds to step 527. In step 527, the caller is notified, e.g., via an audio prompt that there are no new messages. The connection between the IP and the subscriber is then allowed to terminate, in step 528, in accordance with voice dialing procedures in the event a voice dialing call is placed or if the subscriber hangs up.

In one embodiment, in the case where the connected subscriber is a voice dialing customer, a preselected amount of time may be allowed to pass in step 527 before the no new messages prompt is played. If the subscriber initiates a voice dialing call during this period, the call will be allowed to terminate as a conventional voice dialing call without the prompt being played to the subscriber.

If, in step 526 it is determined that there are new messages for the subscriber, operation proceeds to step 530. In step 530, the subscriber is notified of the presence of a waiting message, e.g., by playing the prompt indicated in the database 310 for the connected subscriber. From step 530 operation proceeds to step 531 wherein an inquiry is made as to whether or not the subscriber wants to retrieve the messages. The inquiry may involve playing of a message asking if the subscriber wants to retrieve the messages followed by monitoring of the call connection to detect a spoken YES or NO response.

If, in step 531, a NO response is detected operation proceeds to step 528 wherein the call connection is allowed to terminate according to normal voice dialing procedure or NFA protocol operation.

If, in step 531, a YES response is detected indicating that the subscriber wants to retrieve the waiting messages operation proceeds to step 532.

In step 532 the control IP establishes a connection between the subscriber and a voice mail IP where one or more messages are waiting for the subscriber. The voice mail IP 228, 230 to which the subscriber is connected is determined by the information in the database 310 which indicates which IP contains the subscriber's waiting message or messages.

As part of the process of establishing the connection between the connected subscriber and voice mail IP, the control IP seizes a line of one of the T1 links coupled to the control IP. In addition, it controls the switching matrix 234 to route the subscribers call, via the C.O. switch 216, to the desired voice mail IP 228, 230. In this manner, the control IP 232 establishes a connection between the subscriber and the voice mail IP 228 or 230 while remaining connected to the line.

As part of the process of establishing the connection between the subscriber and voice mail IP 228 or 230, the control IP supplies both the connected subscriber's account number and PIN number information to the voice mail IP thereby eliminating the need for the connected subscriber to enter this information.

Once a connection is established with one of the voice mail IPs 228, 230, the control IP 232 signals, in step 534, the C.O. switch 216 to take its digit receiver off-line. In step 536 voice dialing support is de-activated if it was enabled. Accordingly, by the end of step 536, the relatively expensive combined speaker independent and speaker dependent speech recognition circuit 408 used for voice dialing is released from servicing the connected subscriber. In addition, because the DTMF receiver of the central office switch is disable with regard to the connected subscriber, the connected subscriber is free to interact with the voice messaging IP through the use of DTMF or voice instructions without accidentally initiating a telephone call.

From step 536 control IP operation proceeds to steps 542 and 548 via connectors 538, 540.

The path comprising steps 542, 544, 546 represents speech recognition and DTMF generation functionality supported by the control IP 232 which is provided to facilitate subscriber interaction with a voice mail or other connected service IP. This functionality is provided through the use of one of the speaker independent speech recognition circuits 404, 406 and the DTMF tone generator/receiver 410. While speaker independent recognition is used in the illustrated embodiment speaker dependent recognition may be used alone or in combination with speaker independent speech recognition Step 542 involves monitoring the line connected to the subscriber for speech such as the instruction "press one" or "one" which is to be recognized and converted into DTMF tones. Upon one of the speech recognition circuits 404 or 406 detecting a spoken digit, e.g., as part of a phrase such as "press one", a signal is sent to the DTMF tone generator circuit 410 instructing it to generate a DTMF tone corresponding to the detected digit. In step 544, one or more DTMF tones are generated in response to the speech recognized in step 542.

The generated DTMF tones 546 are transmitted by the control IP 232 to the voice mail IP 228 or 230 to which the subscriber is connected. However, to avoid annoying the subscriber with the DTMF tones, in one embodiment, the line to the subscriber is muted while the tones are transmitted to the voice mail IP. Thus, the voice mail IP receives the DTMF signals generated from the subscribers speech and can respond thereto without the subscriber having to enter the signals by pressing keys and without the subscriber having to listen to the tones.

After transmission of the generated tone operation proceeds to step 542 where the connection is monitored for additional speech. The process of monitoring the connection to a voice mail IP will continue for the duration of the connection to the voice mail IP. Accordingly, while connected to the voice mail IP 228 or 230, the subscriber will have the opportunity to input responses or commands to the voice mail IP using speech as opposed to having to press keys of a telephone.

The path beginning with step 548 may occur in parallel with the path beginning with step 542. In step 548 the connection between the subscriber and the voice mail IP 228, 230 is monitored for a voice mail IP connection termination control signal e.g. from the voice mail IP or subscriber. Operation progresses to step 550 when a termination signal is detected. In step 550 the connection between the subscriber and the voice mail IP 228, 230 is terminated. From step 550 operation proceeds to step 552 wherein the database 310 is updated to reflect the review of messages by the subscriber which were stored on the voice mail IP to which the subscriber was connected.

After termination of the connection with the voice mail IP 228 or 230, a determination is made in step 554 as to whether or not there are new messages waiting for the subscriber on another voice mail IP.

This is done by, e.g., checking the updated database entry for the connected subscriber indicating the message waiting status. For example, if the connected subscriber were Bob Barker, after connecting to the second voice mail IP 230, there would still be voice mail messages on first voice mail IP 228. However, if the connected subscriber were Mary Wells, there would be no additional messages waiting for the subscriber.

If in step 554, it is determined that there are additional new messages waiting for the subscriber, e.g., on a different voice IP, operation proceeds to step 524 thereby causing the subscriber to automatically be connected to the IP with the messages.

However, in step 554 if it is determined that there are no more messages waiting for the connected subscriber, operation proceeds to step 558 wherein a determination is made as to whether or not the connected subscriber is a voice dialing subscriber. If the connected subscriber is a voice dialing subscriber, operation proceeds to step 560 wherein the voice dialing function of the control IP 232 is enabled by, e.g., re-connecting the combined speaker independent and speaker dependent speech recognition circuit 408 to the connected subscriber's line.

In addition, the C.O. switch's digit receiver 226 is also enabled in step 560. Accordingly, the connected subscriber can complete a call to a spoken or dialed telephone number without the need to hang-up after receiving his or her messages. Under such circumstances, termination of the connection with the caller will occur in accordance with normal voice dialing procedures which may include the connected subscriber hanging up the telephone.

Figure 5A:
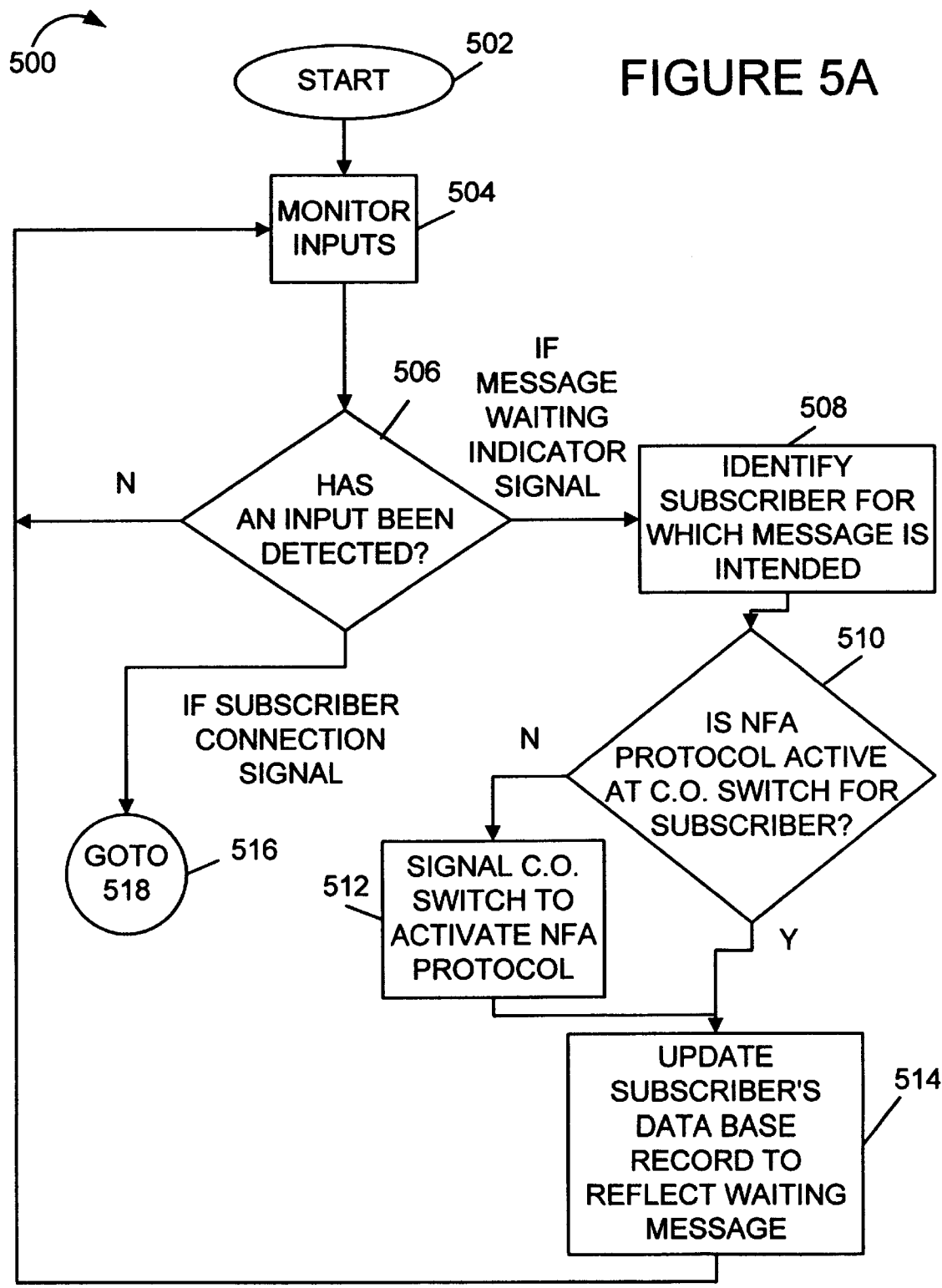
Figure 5B:
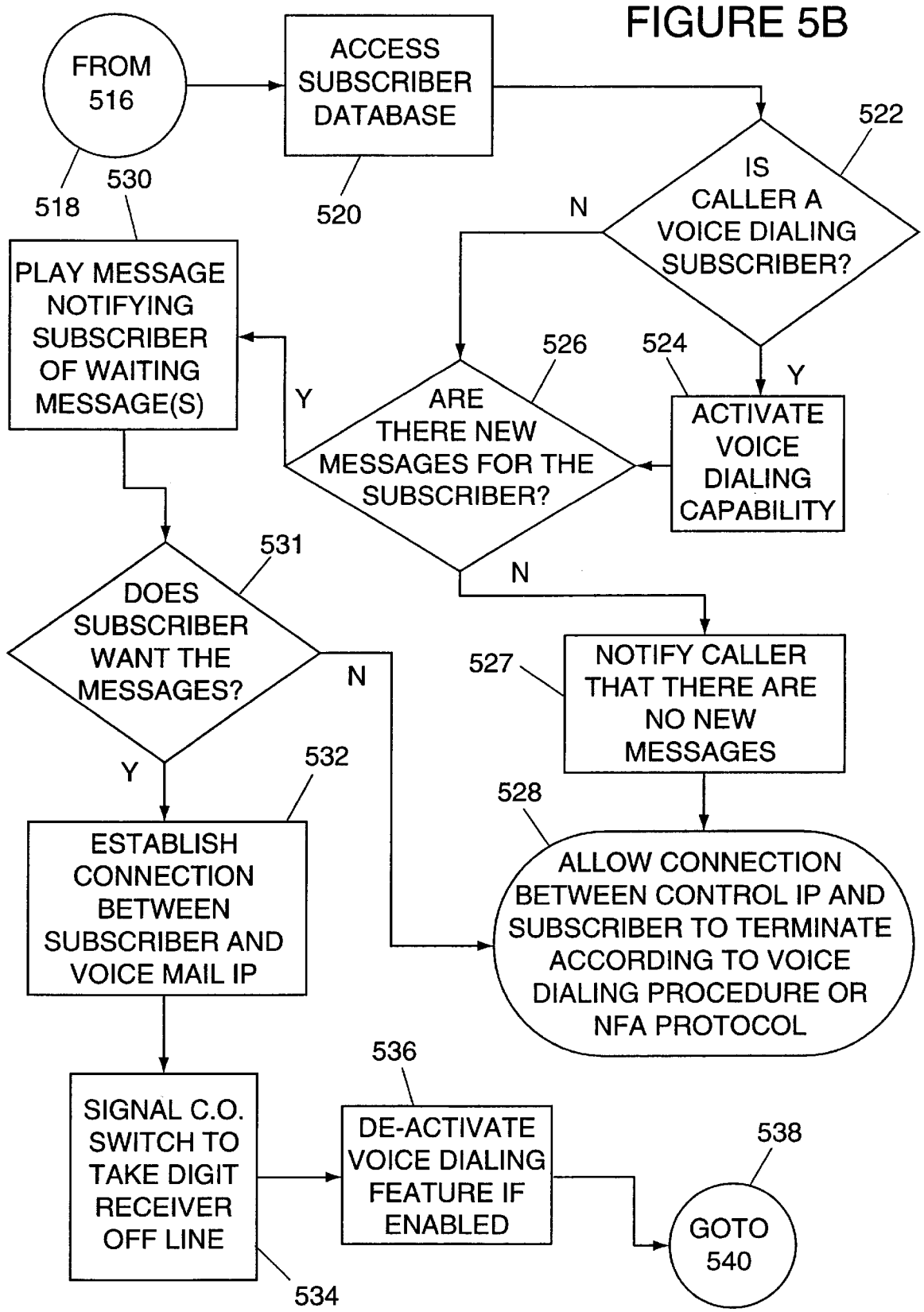

While not explicitly stated in the flow diagram of FIGS. 5A–5B it is to be understood that a connected subscriber can terminate the call at any time by hanging up. Hanging up causes the control IP 232 to terminate the subscriber's connection with any voice mail IP's which may exist at the time of call termination. In addition, the control IP 232 updates the database 232 to reflect the retrieval of messages prior to call termination if, in fact, any messages where retrieved.

Figure 6:
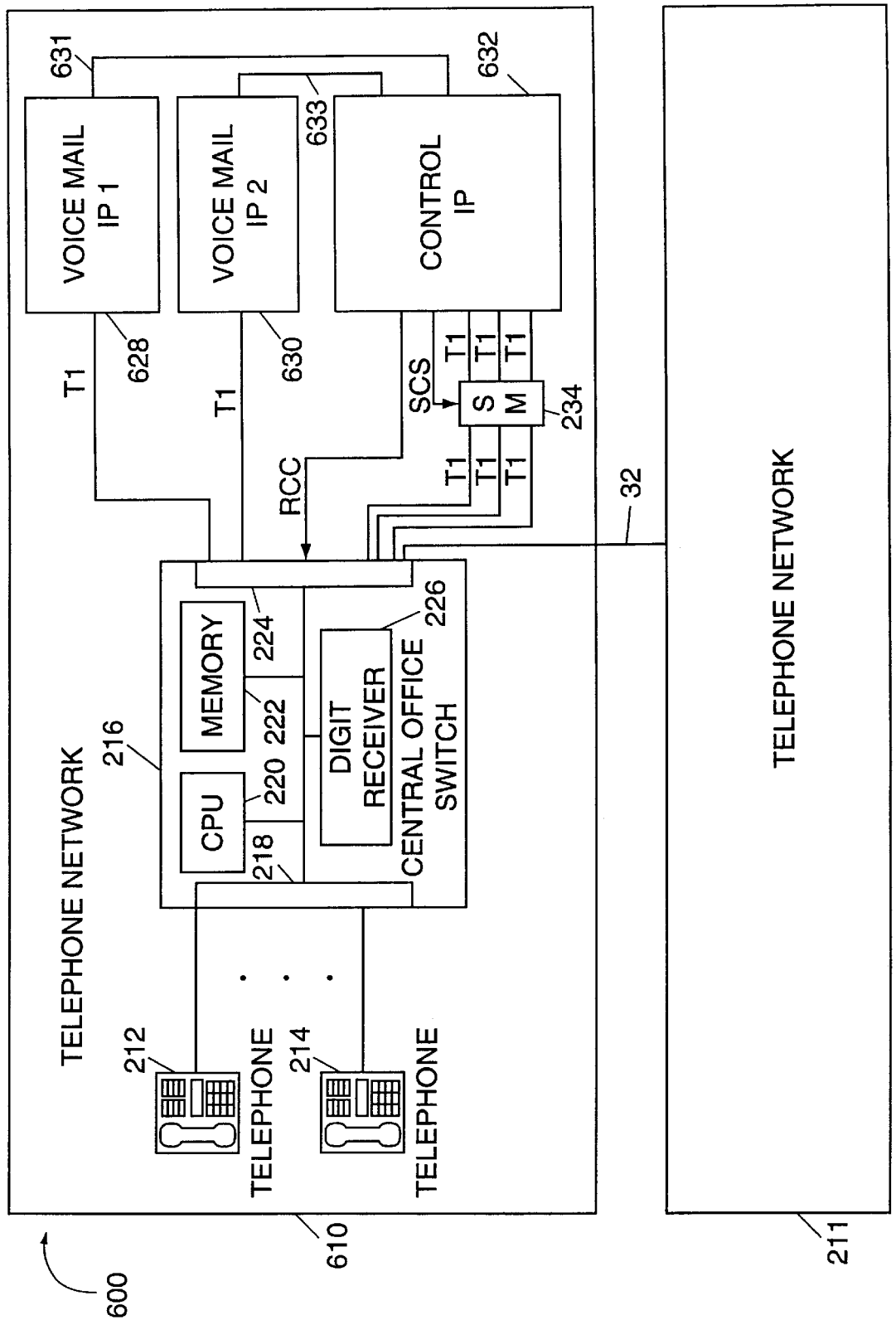
FIG. 6 illustrates a telephone system implemented in accordance with another embodiment of the present invention.

FIG. 6 illustrates a telephone system 600 implemented in accordance with another embodiment of the present invention. The system 600 comprises a plurality of telephone networks 610, 211 coupled together by a fiber optic line 32. The telephone network 610 comprises many of the same elements as the network 210. Elements of the FIG. 2 and FIG. 6 embodiments which are the same, or similar, bear the same reference numbers and will not be described again.

The FIG. 2 and Fig, 6 embodiments differ principally in the way in which the telephone network's peripheral devices, including first and second voice mail IPs 628, 630 and a control IP 632 are connected together. Note that SMDI lines are not used in the FIG. 6 embodiment as they are in the FIG. 2 embodiment. Instead, digital lines 631, 633 are used to connect the first and second voice mail IPs 631, 633 to the control IP 632.

By using digital lines in this manner, information not available over an ordinary SMDI line can be supplied to the control IP 632. For example, a brief message introduction may be sent by the voice mail IP to the control IP 632. The introduction may include a 15 or 30 second sound message provided by a person leaving the message to identify him or herself. Alternatively, in the case of a multi-person account, the information provided by the digital line 631 or 632 may be a recording identifying the name of the recipient for which the message is intended. In addition to receiving information about waiting messages from the first and second voice mail IP's, in one embodiment, the control IP 632 uses the lines 631, 633 when establishing a connection between a connected caller and subscriber. The lines 631, 633 may be implemented using a plurality of digital data and/or control lines. In one particular embodiment the lines 631, 632 are implemented as lines which implement the known signaling system 7 (SS7) protocol frequently used to implement telecommunications and data networks.

While the use of a control IP to facilitate the interaction of multiple IPs which provide services to the same subscriber has been described in the context of a voice mail embodiment, it is to be understood, that the features of the present invention are applicable to facilitating subscriber/IP access and IP interaction regardless of the type or types of services being provided by the IPs.

While the substitution of speech recognizer circuits has been discussed above as a cost effective method of providing speech recognition services to a plurality of telephone users, in accordance with one embodiment of the present invention, multiple speech recognizers are used to process the same speech. In one such embodiment, a low or mid level speech recognizer circuit such as the recognizer circuit 404 or 408 is used to service all or most of a call. For portions of a call where more complicated, e.g., large vocabulary, speech recognition is required, an additional speech recognizer such as the speech recognition circuit 406 is also assigned to service the call in conjunction with the other speech recognizer. By switching in a high end speech recognition unit for the small portion of a call where, e.g., large vocabulary speech recognition is required, speech recognition service is provided without having to use the large vocabulary speech recognizer for the entire duration of the call. In addition, speech recognition functionality included in the low or mid level speech recognizer circuit need not be duplicated in the higher end speech recognition circuit which is switched in to supplement the speech recognition capability being provided.

Additional embodiments and features of the present invention will be readily apparent to those skilled in the art in view of the above discussion and exemplary embodiments set forth in the present application.

What is claimed is:

1. A telephone system, comprising:

a telephone corresponding to a telephone subscriber;

a switch coupled to the telephone, the switch including an automatic peripheral device connection feature which, when enabled, causes a connection to be established between a telephone and a peripheral device in response to the switch detecting an off-hook condition of the telephone, the switch being responsive to a control signal to enable and disable the automatic peripheral device connection feature;

a first service peripheral device for providing a first service to the telephone subscriber; and a control peripheral device coupled to the switch and to the first service peripheral device for detecting when the first service peripheral device has stored information to be provided to the subscriber and for generating the control signal used to enable and disable the automatic peripheral device connection feature.

2. The telephone system of claim 1, further comprising:

a recent change channel coupling the control peripheral device to the switch for communicating the control signal generated by the control peripheral device to the switch.

3. The telephone system of claim 1, further comprising:
a telephone switching matrix for coupling the switch to the control peripheral device.

4. The telephone system of claim 3, further comprising:
a first data line, which couples the service peripheral device to the control peripheral device, the first data line for providing subscriber service information to the control peripheral device.

5. The telephone system of claim 4,
wherein the first service peripheral device is a voice mail device; and
wherein the subscriber service information is message waiting information.

6. The telephone system of claim 5, wherein the data line is a simplified message desk interface (SMDI) line.

7. The telephone system of claim 5,
a second service peripheral device coupled to the switch and to the control peripheral device for providing a second service to the telephone subscriber; and
a second information line, which couples the service peripheral device to the control peripheral device, the second information line for providing subscriber service information to the control peripheral device.

8. The telephone system of claim 5, wherein the control peripheral device includes:
a speech recognizer circuit;
a subscriber database including information on voice mail services provided to the subscriber by the first and second service devices; and
an application processor coupled to the speech recognizer circuit and subscriber database.

9. The telephone system of claim 8,
wherein the speech recognizer circuit converts spoken numbers to corresponding DTMF tones which are supplied to one of the first and second service peripheral devices via the switching matrix coupled to the control peripheral device.

10. The telephone system of claim 3, further comprising:
a digital communication line which couples the service peripheral device to the control peripheral device, the digital communication line for providing subscriber service information to the control peripheral device.

11. The telephone system of claim 10,
wherein the first service peripheral device is a voice mail device; and
wherein the subscriber service information is message waiting information.

12. A telephone system, comprising:
a telephone corresponding to a telephone service subscriber;
a switch coupled to the telephone, the switch includinng an automatic peripheral device connection feature which, when enabled, causes a connection to be established between a telephone and a peripheral device when the switch first detects the telephone being off-hook after a period of being on-hook;
a first service peripheral device coupled to the switch; and
a control peripheral device coupled to the switch, and the first service peripheral device for controlling the automatic establishment of connections between the telephone and the first service peripheral device in response to an off-hook telephone condition initiated by the subscriber.

13. The telephone system of claim 12, further comprising:

a second service peripheral device coupled to the switch; and
a switching matrix for establishing a connection between the subscriber and the control peripheral device.

14. The telephone system of claim 12, wherein the control peripheral device includes:
means for determining which one of the first or second service peripheral devices to couple the telephone to via the switching matrix in response to a telephone off-hook condition.

15. The telephone system of claim 14, further comprising a database of subscriber information including information about messages waiting for the subscriber on either of the first and second service peripheral devices.

16. The telephone system of claim 14, wherein the control peripheral device includes:
means for performing speech recognition.

17. The telephone system of claim 16, wherein the control peripheral device further includes:
means for performing a voice dialing operation.

18. A method of operating a telephone system including a telephone corresponding to a subscriber, a service peripheral device, and a switch capable of automatically connecting the telephone to at least one peripheral device in response to an off-hook condition of the telephone, the method comprising the steps of:
detecting when a message is waiting for the telephone subscriber at the service peripheral device;
monitoring to detect an off-hook condition of the telephone; and
in response to detecting a waiting message for the subscriber and a telephone off-hook condition, automatically connecting the subscriber to the service peripheral service device.

19. The method of claim 18, wherein the step of:
detecting when a message is waiting for the telephone subscriber at the service peripheral device is performed by the switch and includes the step of:
operating the switch to monitor for the receipt of a signal indicative of a waiting message at the service peripheral device.

20. The method of claim 18, wherein the telephone system further includes a control peripheral device coupled to the switch and the service peripheral device, the step of detecting when a message is waiting being performed by the control peripheral device.

21. The method of claim 20, wherein the step of automatically connecting the subscriber to the peripheral service device includes the steps of:
establishing a connection between the subscriber and the control peripheral device; and
establishing a connection between the control peripheral device and the service peripheral device.

22. The method of claim 21, wherein the step of establishing a connection between the control peripheral device and the service peripheral device includes the step of:
transmitting subscriber voice mail account information to the service peripheral device.

23. The method of claim 21, further comprising the step of:
operating the control peripheral device to detect a spoken number; and
operating the control peripheral device to generate a DTMF signal corresponding to the detected spoken number.

24. The method of claim 23, further comprising the step of;

transmitting the generated DTMF signal to the service peripheral device.

25. The method of claim 24, further comprising the step of:

muting the connection from the control peripheral device to the subscriber while transmitting the generated DTMF signal to the service peripheral device.

26. The method of claim 18, wherein the plurality of service peripheral devices are voice mail peripheral devices, the method further comprising the step of:

operating the control peripheral device to:
i. identify at least one of the plurality of voice mail peripheral devices that has a waiting message for the subscriber; and
ii. selecting the identified one of the plurality of voice mail peripheral devices as the one of the plurality of peripheral devices to which the telephone is connected upon connection of the telephone to the control peripheral device.

27. The method of claim 26, further comprising the step of:

operating the control peripheral device to detect when a subscriber has been connected to a peripheral device where a stored message for the subscriber was detected; and in response to detecting that a subscriber has been connected to a peripheral device where a stored message for the subscriber was detected, signaling the switch to disable the automatic peripheral device connection feature.

28. The method of claim 26, wherein the automatic peripheral device connection feature is implemented using a network facility access protocol.

29. A method of controlling the connection of a telephone corresponding to a service subscriber to one of a plurality of service peripheral devices, comprising the steps of:

providing said plurality of service peripheral devices, each of said service peripheral devices being capable of providing a service to the subscriber when connected to the telephone;

providing a control peripheral device;

providing a switch including an automatic peripheral device connection feature which, when enabled, causes the telephone to be automatically connected to the control peripheral device in response to detecting that said telephone is off-hook and which, when disabled, does not cause the telephone to be automatically connected to the control peripheral device in response to detecting that said telephone is off-hook; and operating the control peripheral device to connect the telephone corresponding to the service subscriber to one of the plurality of service peripheral devices.

30. The method of claim 29, further comprising the step of:

detecting when one of the plurality of service peripheral devices has a stored message for the subscriber; and signaling the switch to enable the automatic peripheral device connection feature when a stored message for the subscriber is detected.

* * * * *